Oct. 29, 1957   H. L. PRAEGER   2,811,081
UNIVERSAL FOCAL LENGTH PHOTO-OBJECTIVE SYSTEM
Filed July 3, 1952   3 Sheets-Sheet 1
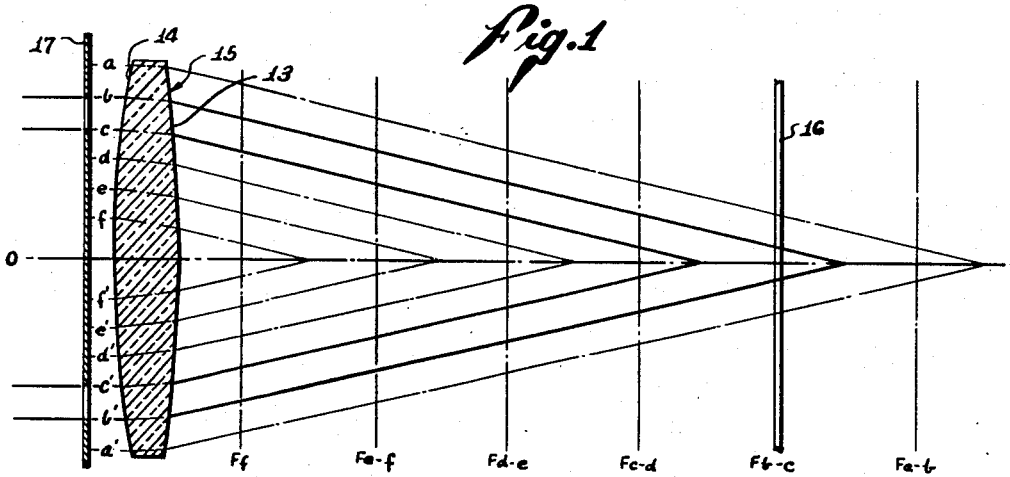
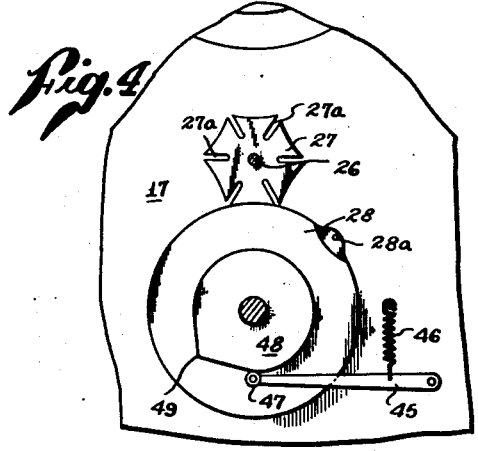
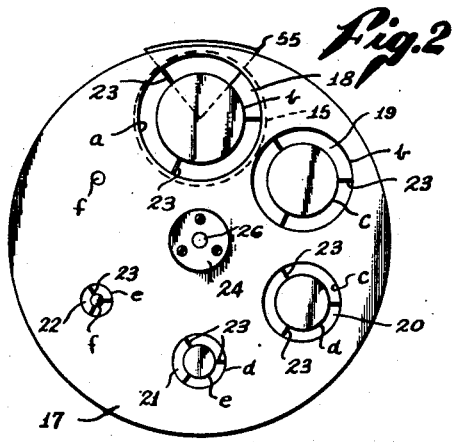
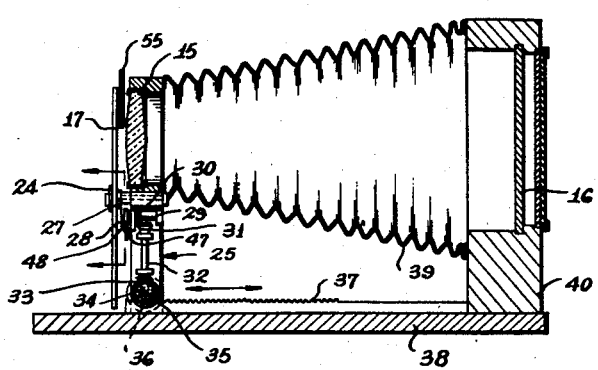
INVENTOR.
HENRY L. PRAEGER
BY Fulwider & Mattingly
Attorneys

INVENTOR.
HENRY L. PRAEGER

Oct. 29, 1957 H. L. PRAEGER 2,811,081
UNIVERSAL FOCAL LENGTH PHOTO-OBJECTIVE SYSTEM
Filed July 3, 1952 3 Sheets-Sheet 3
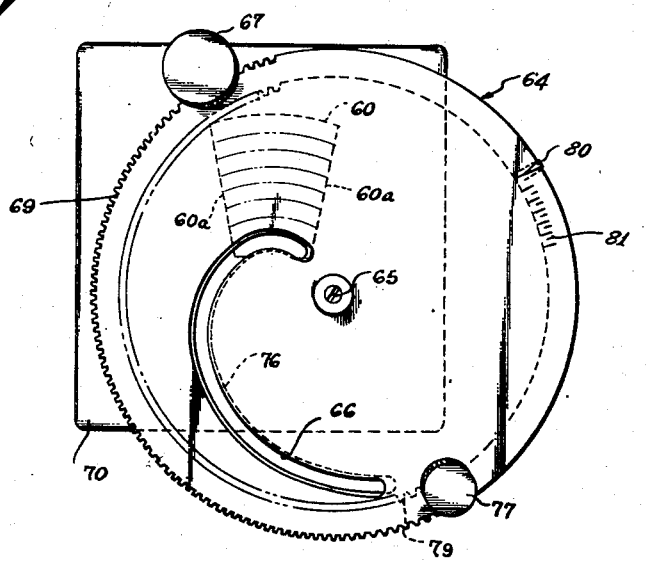
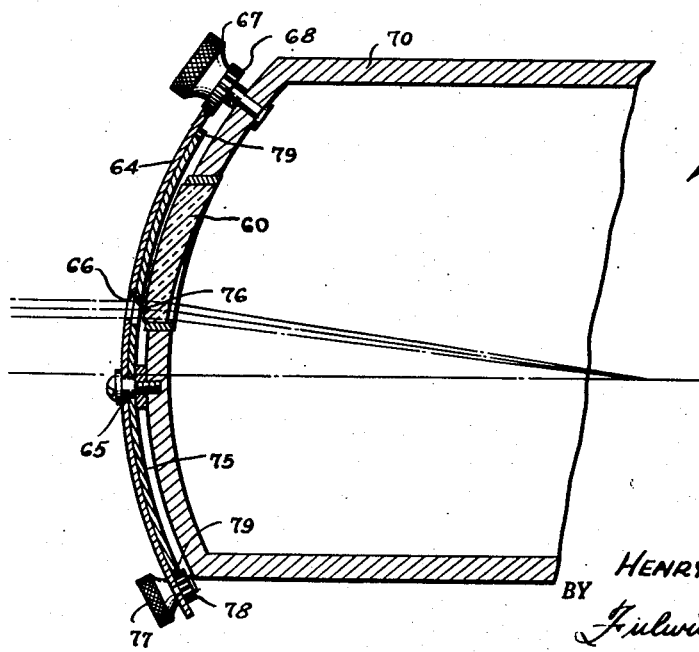
INVENTOR.
HENRY L. PRAEGER
BY
Attorneys United States Patent Office 2,811,081
Patented Oct. 29, 1957

2,811,081
UNIVERSAL FOCAL LENGTH PHOTO-OBJECTIVE SYSTEM

Henry L. Praeger, Los Angeles, Calif.

Application July 3, 1952, Serial No. 297,085

14 Claims. (Cl. 88—57)

My invention relates generally to objectives for use in photography, television, and the like, and more particularly, to an objective of this class which may be adjusted without the removal or relative positional change of optical elements to increase or decrease the focal length thereof.

This application is a continuation-in-part of my previous application, Serial No. 70,105, filed January 19, 1949, entitled Lens, now abandoned and Serial No. 78,771, filed February 28, 1949, entitled Non-concentric Lens, now abandoned.

Universal focal length lenses have, in the past, been designed either as compromises which sacrifice some sharpness of image in order to attain a uniform degree of sharpness over an extremely wide focal length range, or have been designed as complex optical systems in which the various lens elements are moved relative to each other and to the image plane in order to change the overall focal length of the objective. The former expedient is substantially useless for anything but very inexpensive cameras and the like, the reason being that the quality of image produced is of a low order. The second expedient is not entirely satisfactory for the reason that complex and accurate lens mounting systems are required in order to properly synchronize the movement of the various parts of the objective, and furthermore, such objectives are very expensive due to the necessity of fabricating and matching a relatively large number of optical elements.

With a view to overcoming the disadvantages above stated, and with a further view to providing additional advantages not possible with either of the systems above mentioned, it is a major object of the present invention to provide a universal focal length objective for photography and the like in which the adjustment of focal length is made by selecting certain zonal portions of a single lens and masking off the remaining portions.

It is another object of the invention to provide in an image forming system, means for automatically synchronizing the change in focal length with an appropriate change in the aperture of the objective whereby uniform exposure is produced through the objective irrespective of the focal length to which it is adjusted.

Still another object of the invention is to provide in combination with a photographic objective, a selective aperture plate for selecting certain operative zones of the lens, which aperture plate is further adjustable to increase or decrease the area of the zone selected.

The foregoing and additional objects and advantages of the invention will be apparent from the following description of several embodiments thereof, such consideration being given likewise to the attached drawings, in which:

Figure 1 is a semi-schematic axial diagram illustrating by ray tracing the character of the optical element employed in the present invention;

Figure 2 is a front elevational view of an aperture plate employed in connection with the lens illustrated in Figure 1;

Figure 3 is a side elevational view of a photographic camera incorporating the lens of Figure 1, the aperture plate of Figure 2, and showing additional mechanism for interrelating the operation of the lens and aperture plate;

Figure 4 is an enlarged elevational view taken on the line 4—4 in Figure 3;

Figure 8 is a front elevational view of an aperture plate and mounting employed in connection with the modified lens element of Figures 5 and 6; and Figure 9 is an axial section taken on the line 9—9 in Figure 8.

Figure 5:
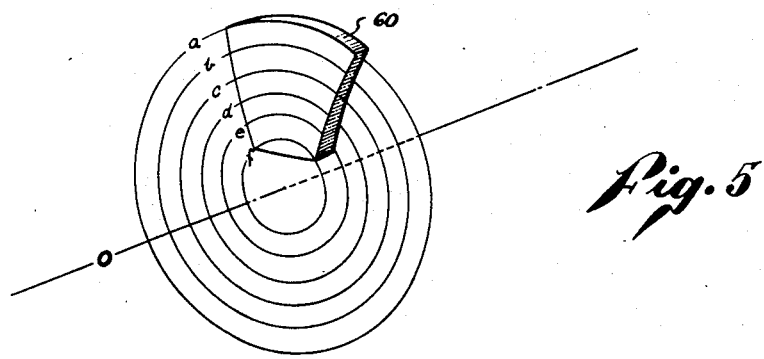
Figure 5 is an enlarged perspective view of a modified non-concentric lens element involving the present invention.

Referring to Figure 1, I have identified the specially shaped lens incorporated in the present invention by the reference character 15. The lens 15 is movably positioned on an optical axis O to focus an image on a plate 16, such image being formed in any given case by certain selected groups of a plurality of substantially parallel rays $a$, $b$, $c$, $d$, $e$, and $f$, entering the lens element 15 from the left. An annular aperture plate 17 is positioned immediately to the left of the lens element 15 excluding from passage therethrough all rays except a selected group impinging the lens 15 in a zone defined by circles having radii $Oc$ and $Ob$ respectively.

The ray pattern produced by the lens of the present invention, it will be noted, differs from that of a conventional photographic objective wherein parallel entrance rays are all focused to intercept the axis at substantially the same point. The particular ray pattern produced by the lens of the present invention is achieved by a specially shaped optical surface, or surfaces therein. In the particular example given, the front surface 14 of the lens is spherical, while the rear surface 13 is aspherical, tending toward a convex conical shape (exaggerated for clarity in the drawings). It will be realized by those skilled in the art that by appropriate shaping of the optical surfaces, ray patterns of the type shown in Figure 1 may be produced. Such a pattern may be produced by the aspherical shaping of either or both of the optical surfaces of the element 15.

It will be noted that various pairs of rays $a$—$a'$, $b$—$b'$, etc., intersect the axis O at spaced intervals along the latter. The axial distances between successive intersections of the ray pairs, above identified, represent distinct focal ranges. These ranges are identified by the characters $F_{a-b}$, $F_{b-c}$, $F_{c-d}$, $F_{d-e}$, $F_{e-f}$, and $Ff$.

Thus it will be seen that the effective focal length of concentric zones of the lens 15 vary continuously as the radii of such zones increases, and the focal length is greatest in the zone $a$—$b$, and shortest in the central circular area defined by the circle $f$. Accordingly, the effective focal length of the lens 15 is adjusted by selecting one of the several annular zones for operative exposure and masking off the remaining area of the lens. For this purpose, a selective diaphragm plate of the type shown in Figure 2 is employed in the present embodiment, although it will be realized that other means for selectively masking off all but an annular zone of desired size may be employed.

The aperture plate 17 shown in Figure 2 is mounted for rotation about an axis spaced below the optical axis O of the lens 15. Formed in the plate 17 are a plurality of annular slots 18, 19, 20, 21 and 22, and a circular opening $f$. The plate 17 may be formed in various ways, as for example, by coating a disc of glass or other transparent material with an opaque layer, and removing such layer in the annular areas forming the slots 18—22. In the present instance, the slots are formed by supporting small circular plates within a circular aperture, the inner plates being supported on spoke-like members 23. Thus it will be seen that the aperture slot 18 is defined by an outer edge *a* and an inner edge *b*, the slot 19 is defined by an outer edge *b* and an inner edge *c*, etc. The radial positions of the various edges are shown by the corresponding letters in Figure 1. The circular aperture *f* defines the minimum focal length condition of the lens 15. The centers of the annular slots 18—22 are arranged at evenly spaced intervals around the center of the plate 17 whereby the annular slots may be selectively rotated into a position of concentricity with the optical axis O.

For a description of the means by which the positioning of the aperture plate 17 is synchronized with the focusing movement of the lens 15, reference is now made to Figure 3, wherein it will be seen that the lens 15 is mounted on a conventional lens board or mount 25 supported on a camera bed 38 for movement toward and away from the plate 16. The camera illustrated may also include a shutter and other conventional features not forming a part of the present invention and hence not illustrated herein. The aperture plate 17 is also supported on the lens mount 25 by means of a hub 24 and a journaled axle 26. Intermittent rotation of the plate 17 to bring one or another of the apertures into appropriate position in front of the lens 15 is accomplished by means of a conventional Geneva movement comprising a driven member 27 and a driving member 28. The driven member of the Geneva movement is secured to the axle 26, while the driving member 28 is in turn drivingly connected to a focusing pinion 35 by a gear train comprising a bevel gear pair 30—31, a vertical shaft 32, and a lower bevel gear pair 33—34, the latter being mounted on the shaft 35 of the pinion 36. Thus, as the pinion 36 is rotated in mesh with a fixed rack 37 to move the lens 15 toward or away from the plate 16, the Geneva movement operates intermittently as the lens 15 passes from one zone F into the next adjacent zone. The just described operation serves to move the appropriate aperture into place in front of the lens 15. Due to the conventional interlocking construction of the Geneva members 27 and 28, the plate 17 is held against rotation except during the brief transition from one zone to the next, during which the Geneva elements are drivingly interengaged by a pin 28a which enters slots 27a in the driven member 27. In order to prevent the system from coming to rest at a position in which no aperture slot is accurately aligned in front of the lens, a cam 48 may be mounted coaxially with the driving element 28 of the Geneva movement, such cam having a lobe 49 thereon diametrically opposite the drive pin 28a, the cam 48 being engaged by a pressure roller 47 mounted on a pivot arm 45 and urged into such engagement by a tension spring 46.

Thus, each time the drive pin 28a engages a slot 27a in the driven member 27, the cam lobe 49 simultaneously passes under the pressure roller 47. The result of this action is that if manual operation of the focusing movement is discontinued at a point intermediate two focal ranges, the pressure roller 47 will ride down one side or the other of the cam lob 49, thus forcing the closest adjacent aperture slot to be aligend in front of the lens 15.

Accurate focusing within any one of the focal ranges $F_{a-b}$, etc., is accomplished in the usual manner by means of the rack 37 and pinion 36, such focusing movement intermediate the transition points not being transmitted to the aperture plate 17 due to the aforesaid interlocking of the Geneva movements 27—28.

The "F number" of any lens is a measure of its speed and is determined by dividing its focal length by the diameter of its aperture. In the case of the system shown in Figure 3, the "F number" for each aperture of plate 17 will have to be determined by reference to a hypothetical circular aperture equivalent in area to that of the particular annulus in the given case. From a consideration of this fact, it will be seen that in the arrangement shown wherein the increase in focal length is directly proportional to the increase in diameter of the effective zone, the focal length increases at a rate greater than the rate of increase of the equivalent circular aperture diameters. Thus, annuli of equal width would not produce a system of uniform speed for all focal length settings. Accordingly, in order to achieve a completely uniform speed over the entire range of focal length adjustments, the width of the various slots are made to differ as between themselves. Such an arrangement is indicated in Figure 2 wherein it will be seen that the width of the various slots increases as their diameters increase. A similar effect could be achieved, it will be realized, by so shaping the lens surfaces that the focal length increases at a non-uniform rate with respect to the increase of zone diameter.

While the invention has been described in connection with a still camera as shown in Figure 3, it will be realized that the principles thereof may be embodied with equal or greater effectiveness in motion picture and television cameras. In connection with the latter, the manual focal length selection adjustment may be replaced with a power driven focusing adjustment synchronized with the motion picture film movement in such a manner that the transitional movement of the aperture plate 17 occurs during the film pull-down period, thus making possible a smooth "zoom" shot without any apparent discontinuities in the final result.

In the form of the device illustrated in Figure 3, adjustment of the aperture ratio may be accomplished by interposing a sector-shaped plate 55 of appropriate angle between the lens 15 and the aperture plate 17, thus adjusting the exposed peripheral length of the slot of any particular aperture then in front of the lens.

For a description of a modified form of my invention employing a non-concentric lens element 60, reference should now be had to Figures 5 through 9.

The modified non-concentric lens element 60 is, as shown in Figure 5, formed in the approximate shape of a truncated sector of a circle. The shape is not exactly that of a sector, however, since the two sides are not necessarily radii of the circular blank 61 from which the element 60 is cut (see Figure 7).

Figure 6:
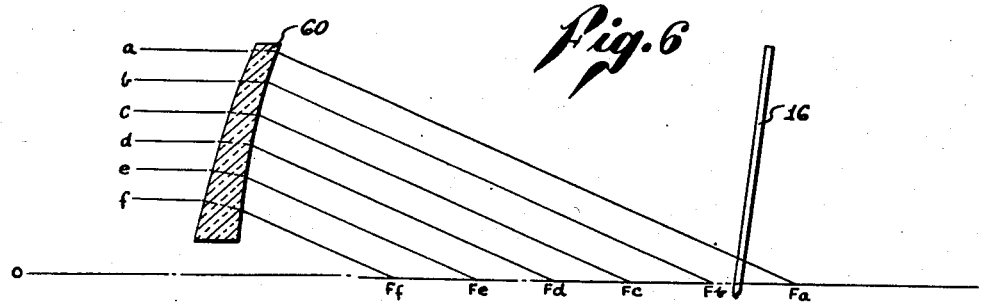
Figure 6 is an axial elevational section of the lens element illustrated in Figure 5, also showing the tracing of rays through the lens.
Figure 7:
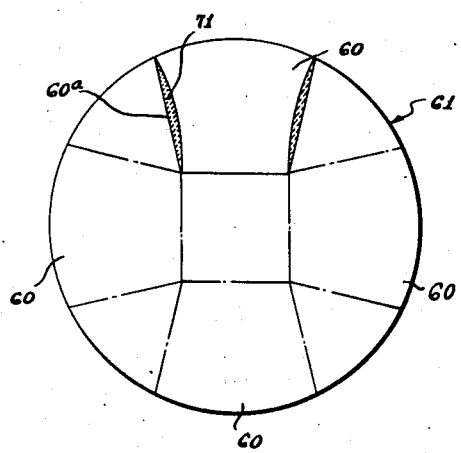
Figure 7 is a front elevational view of a lens blank showing a step in the fabrication of the lens element illustrated in Figures 5 and 6.

The blank 61 from which a number of lens elements 60 are cut, is of the same general character as the lens 15 described in connection with the previous embodiment, except that here the front surface is aspherical and the rear spherically concave. Thus, the ray pattern produced by parallel rays passing through the lens element 60 is equivalent to approximately one-half of the pattern shown in Figure 1. This pattern is illustrated in Figure 6, wherein it will be seen that each of a series of parallel entrance rays, *a*, *b*, *c*, *d*, *e*, and *f*, is refracted downwardly to intersect the optical axis O at one of a number of focal points $F_a$, $F_b$, $F_c$, $F_d$, $F_e$, and $F_f$. It will also be noted in Figure 6 that the optical axis O is outside the body of the lens element 60. It will be seen that each of the rays *a*, *b*, *c*, *d*, *e*, and *f* is one of a group of similarly refracted rays impinging the lens element 60 on a circular arc. Such arcs are identified by the reference characters *a*, *b*, *c*, *d*, *e*, and *f* in Figure 5, and it will be realized that all the rays along any particular arc are refracted to the same point, thus to form an image.

Thus the lens element 60 may be used to focus an image on a plate 16 in the same manner as described previously in connection with the lens 15 by selecting one of a number of the zones of different focal length in the lens element 60, such zones being the arcuate zones defined by adjacent pairs of the concentric arcs $a, b, c, d, e$, and $f$ shown in Figure 5.

A special aperture plate 64 for selecting one of the zones above referred to is illustrated in Figures 8 and 9, and will be seen to comprise generally a plate rotatable about a central axis 65 and having a spiral slot 66 therein. The fixed center 65 upon which the plate 64 rotates is so located with respect to the optical axis O, and the shape of the slot 66 in such that, as the plate 64 is rotated, the slot 66 sweeps outwardly across the lens element 60 and the area of the latter which is exposed at any instant is an arcuate shaped zone very closely approximating that defined by the circular arcs $a, b, c, d, e$, and $f$ drawn about the optical center O (see Figure 5). Thus it will be seen that the adjustment of the aperture plate 64 serves to provide a continuous variation of the zone of the lens element 60 which is exposed, as opposed to the incremental adjustment provided for in the arrangement shown in Figure 3.

Manual means for rotating the plate 64 is provided in the form of an adjustment knob 67 mounted for rotation on a fixed axis and carrying a gear 68 which is meshed with peripheral teeth 69 formed in the edge of the plate 64. Conventional means (not shown) may also be included to couple the rotation of the adjustment knob 67 with the movement of the entire lens mount 70 toward and away from the plate 16 whereby to synchronize the focal zone selection accomplished by the rotation of the plate 64 with the focal length adjustment changing the distance from the lens element 60 to the plate 16. It will be realized that in both of the forms shown herein, the zone selecting means may be used independently of the focal distance changing means by decoupling the two adjustments. To this end, a conventional clutch (not shown) may be included in the interconnecting drive means.

As previously described in connection with the first described embodiment of the invention, it is desirable that once set the speed of the lens remain constant irrespective of the zone selecting adjustment of the aperture plate 64. To this end, the inclination of the sides 60a of the lens element 60 is so selected that for a given width of the slot 66, the particular focal length of any setting divided by the diameter of a circle equivalent in area to the exposed zone gives a substantially constant "F number" throughout the full range of focal length adjustment. Further precision in the uniformity of speed throughout the full range can be achieved by masking the edges of the lens element 60 to a predetermined curve indicated at 71 in Figure 7, thus compensating for variations in transmission losses as between various focal zones.

It will be noted that the exposure slot in the plate 64 is of uniform width throughout its length. As is apparent from the foregoing discussion, adjustment of this uniform width to various values will change the overall speed of the lens. Provision is made for such adjustment by placing an underlying plate 75 against the back surface of the outer plate 64, the underlying plate 75 having a slot 76 therein, identical in shape and width to the slot 66 in the plate 64. Thus, relative rotation of the two plates 64 and 75 will increase or decrease the width of the exposed slot, such exposed slot being defined by one edge of one plate and the opposite edge of the other plate. Means for manually effecting this adjustment is provided in the form of an adjustment knob 77 mounted for rotation in the outer plate 64 and carrying a gear 78 meshed with teeth 79 formed in the periphery of the underlying plate 75. An index 80 carried by the underlying plate and brought around the edge of the overlying plate 64 may be read against a scale 81 formed in the plate 64, to indicate the speed to which the aperture has been adjusted.

It is desirable that the zone selection aperture be as close to the front surface of the lens element 60 as possible. To this end, the two plates 64 and 75 are domed to conform to the sperical front surface of the lens element 60. Such configuration is shown in Figure 9.

It is to be understood that the lens 15 and the lens element 60 shown in the two embodiments described herein may include additional elements cemented thereto, or even air-spaced elements, providing correction of secondary aberrations such as coma, astigmatism, distortion, and the like. The principal distortion encountered in conventional photographic objectives, to wit, spherical abberation, is largely eliminated by the present system, since only a single discrete zone of the objective is employed at any given time. As is well known, the overall haze or blurring of the image resulting from spherical aberration is caused by the fact that the paraxial rays and the peripheral rays focus at different distances from the optical center of the lens. Thus it is impossible with a conventional objective having any degree of spherical abberation, to place the plate at a point where all rays will be sharply focused. The best that can be achieved is a compromise by placing the plate, for example, at a point intermediate the focal point of paraxial rays and the focal point of peripheral rays. Since the difference in focal length between the inner edge and the outer edge of any zone selected in the present objective is relatively small as compared with the difference between paraxial and peripheral rays of the conventional objective, the reduction in image quality caused by spherical aberration is largely obviated by the present invention.

While the invention has been described in terms of successive adjoining zones of differing focal length, it will be realized that in both forms shown, the optical surfaces are without discontinuities and that the focal length at any point on the lens is thus a continuous function of the radial displacement of such point from the optical axis.

While the forms shown and described are fully capable of achieving the objects and providing the advantages hereinbefore stated, it will be realized that they are capable of considerable modification without departure from the spirit of the invention. For this reason, I do not mean to be limited to the forms shown and described, but rather to the scope of the appended claims.

I claim:

1. A photo-objective system comprising in combination: an objective having refractive surfaces shaped to provide adjoining zones of progressively different focal lengths; and aperture means mounted adjacent said objective to block all but a zone-shaped partial area thereof said aperture means being movable transversely with respect to said objective whereby to adjust the effective focal length of said objective to that of the discrete zone exposed by said aperture means at any given position of the latter.

2. A photo-objective system comprising in combination: an objective having an optical axis and refractive surfaces shaped to provide adjoining zones of progressively different focal lengths for successive zones selected at increasing radial distance from said axis; aperture means movably mounted adjacent said objective to block all but an exposed discrete zone thereof whereby to make the effective focal length of said objective for any given position of said aperture means, that of said discrete zone; and means to move said aperture means transversely with respect to said objective to move the zone exposed by said aperture means radially with respect to said axis whereby to change said effective focal length.

3. A photo-objective system comprising in combination: an objective having refractive surfaces shaped to provide adjoining zones of progressively different focal lengths; image receiving means positioned on the optical axis of said objective to receive an image formed thereby; focusing means to adjust the focal distance between said objective and image means; aperture means movably mounted adjacent said objective to block all but an exposed discrete zone thereof whereby to make the effective focal length of said objective for any given position of said aperture means, that of said discrete zone; means to move said aperture means with respect to said objective to change the zone exposed by said aperture means whereby to change said effective focal length; and coupling means interconnecting said aperture moving means and said focusing means to synchronize the operation thereof whereby said effective focal length is always adjusted to correspond substantially with said adjusted focal distance.

4. A photo-objective system comprising in combination: an objective having refractive surfaces shaped to provide adjacent zones each concentric with the optical axis of said objective, said zones being of progressively different focal lengths as the mean diameter of said zones increases; and an aperture plate adjacent said objective and having a plurality of annular apertures therein, each of a different mean effective diameter, said plate being movable transversely with respect to said objective to place any one of said apertures coaxially in front of said objective to operatively expose a selected discrete zone therein; said apertures being of such relative dimensions that each aperture when coaxially positioned as aforesaid exposes an area of said objective which substantially excludes the area exposed by any other aperture.

5. A photo-objective system comprising in combination: an objective having refractive surfaces shaped to provide zones concentric with the optical axis of said objective and of progressively different focal lengths; image receiving means positioned on the optical axis of said objective to receive an image formed thereby; focusing means to adjust the focal distance between said objective and image means; an aperture plate adjacent said objective and having a plurality of annular apertures therein, each of a different mean effective diameter, said plate being movable with respect to said objective to place any one of said apertures coaxially in front of said objective to operatively expose a different selected discrete zone therein; and coupling means interconnecting said aperture plate and said focusing means to synchronize the operation thereof whereby the effective focal length of the zone exposed at any given position of said aperture plate is always in substantial correspondence with said adjusted focal distance.

6. In combination with a lens having its opposite surfaces formed to provide different focal points in progression along its optical axis for the respective rays passing through said lens at points ranging from said optical axis toward the periphery of said lens, aperture means mounted adjacent said lens to move transversely thereof to block all but a discrete exposed annular-sector-shaped zone thereof whereby to adjust the effective focal length of said lens to that of said discrete zone; and means operatively associated with said aperture means to adjust the radial width of said exposed zone whereby to change the depth of focus of said objective for any given focal length adjustment thereof.

7. In combination with a lens having its opposite surfaces formed to provide different focal points in progression along its optical axis for the respective rays passing through said lens at points ranging from said optical axis toward the periphery of said lens, aperture means mounted adjacent said lens to block all but a discrete exposed annular zone thereof whereby to adjust the effective focal length of said lens to that of said discrete zone, and means to move said aperture means radially and transversely with respect to said axis to change the zone of said lens exposed by said aperture means whereby to change said adjusted effective focal length.

8. In combination with a lens having its opposite surfaces formed to provide an optical axis eccentric to the body of said lens, and to provide different focal points in progression along said optical axis for the respective rays passing through said lens at points from the edge nearest said optical axis toward the edge remote therefrom, a stop, annular-sector-shaped aperture which extends across said lens and is substantially concentric with said optical axis, said stop being movable transversely of said axis for adjusting said aperture radially with respect to said axis to various positions across said lens from the edge nearest said optical axis toward the edge remote therefrom, and means supporting said stop for said movement.

9. In combination with a lens having its opposite surfaces formed to provide an optical axis eccentric to the body of said lens, and to provide different focal points in progression along said optical axis for the respective rays passing through said lens at points from the edge nearest said optical axis toward the edge remote therefrom, a stop, the aperture of which extends across said lens and is substantially concentric with said optical axis, said stop being movable for adjusting said aperture to various positions across said lens from the edge nearest said optical axis toward the edge remote therefrom, means supporting said stop for said movement, image receiving means supported for movement along said axis to receive an image formed by said lens, focusing means to move said image means along said axis, and synchronizing means interconnecting said stop and focusing means whereby to place said aperture always at a point to pass rays to the focal point at which said image means is then located.

10. In combination with a lens having its opposite surfaces formed to provide an optical axis eccentric to the body of said lens, and to provide different focal points in progression along said optical axis for the respective rays passing through said lens at points from the edge nearest said optical axis toward the edge remote therefrom, a stop, the aperture of which extends across said lens and is substantially concentric with said optical axis, said stop being movable for adjusting said aperture to various positions across said lens from the edge nearest said optical axis toward the edge remote therefrom, and means supporting said stop for said movement, said stop including means for varying the area of said aperture at any of its said various positions.

11. In combination with a lens having its opposite surfaces formed to provide an optical axis eccentric to the body of said lens, and to provide different focal points in progression along said axis for rays passing through said lens in adjoining arcuate zones of infinitesimal width and progressively decreasing curvature from said optical axis, a stop, the aperture of which extends across said lens and substantially concentric with said optical axis, said stop being movable for adjusting said aperture to various positions across said lens from the edge nearest said optical axis toward the edge remote therefrom, and means supporting said stop for said movement, said stop including means for varying the area of said aperture at any of its said various positions.

12. In combination with a lens having its opposite surfaces formed to provide an optical axis eccentric to the body of said lens, and to provide different focal points in progression along said axis for rays passing through said lens in adjoining arcuate zones of infinitesimal width and progressively decreasing curvature from said optical axis, a stop, the aperture of which extends across said lens and substantially concentric with said optical axis, said stop being movable for adjusting said aperture to various positions across said lens from the edge nearest said optical axis toward the edge remote therefrom, and means supporting said stop for said movement, said stop including means for varying the area of said aperture at any of its various positions, said means for varying said area being a plate movable to various positions transversely of the length of said slot for varying the width of said slot uniformly from end to end where the latter crosses said lens.

13. A photo-objective system comprising in combination: a photographic objective lens having an optical axis and refractive surfaces formed as surfaces of revolution about said axis, said surfaces being so shaped that effective zones of said objective located in a given surface substantially transverse to said axis taken at points progressively more distant from said axis, differ progressively in focal length; and focal length selecting means including an opaque member disposed adjacent said objective lens substantially at said given surface, said member being apertured to expose a restricted zone-shaped area of said surface and to mask off all rays through other areas of said surface, said focal length selecting means further including means to move said opaque member to change the position of said exposed area with respect to said axis whereby to select a zone of said objective of desired focal length and render inoperative all other zones of said objective.

14. A photo-objective system comprising in combination: a photographic objective lens having an optical axis and refractive surfaces formed as surfaces of revolution about said axis, said surfaces being so shaped that effective zones of said objective located in a given surface substantially transverse to said axis taken at points progressively more distant from said axis, differ progressively in focal length; focal length selecting means including an opaque member disposed adjacent said objective substantially at said given surface, said member being apertured to expose a restricted zone-shaped area of said surface and to mask off all rays through other areas of said surface, said focal length selecting means further including means to move said opaque member to change the position of said exposed area with respect to said axis whereby to select a zone of said objective of desired focal length and render inoperative all other zones of said objective; and means to change the radial width of said exposed area whereby to change the effective F-number of said objective for any given focal length setting thereof.

References Cited in the file of this patent

UNITED STATES PATENTS

| | | |
|---|---|---|
| 494,128 | Decker | Mar. 28, 1893 |
| 1,143,316 | Poullain et al. | June 15, 1915 |
| 1,154,232 | Byron | Sept. 21, 1915 |
| 1,351,785 | Paige | Sept. 7, 1920 |
| 2,101,016 | Beach | Dec. 7, 1937 |
| 2,109,474 | Evans | Mar. 1, 1938 |
| 2,233,591 | Dulovitis | Mar. 4, 1941 |
| 2,475,275 | Birchall | July 5, 1949 |

FOREIGN PATENTS

| | | |
|---|---|---|
| 335,696 | Great Britain | Oct. 2, 1930 |